US012780295B2

(12) United States Patent
Liu

(10) Patent No.: US 12,780,295 B2
(45) Date of Patent: Nov. 3, 2026

(54) SYSTEMS AND METHODS FOR STABILITY COMPENSATION BASED ON ELECTRONIC POWER STEERING TORQUE FEEDBACK

(71) Applicant: STEERING SOLUTIONS IP HOLDING CORPORATION, Saginaw, MI (US)

(72) Inventor: Alesssandro Liu, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 107 days.

(21) Appl. No.: 18/743,408

(22) Filed: Jun. 14, 2024

(65) Prior Publication Data

US 2025/0368254 A1 Dec. 4, 2025

(30) Foreign Application Priority Data

Jun. 4, 2024 (CN) ......................... 202410718081.2

(51) Int. Cl.
*B62D 5/04* (2006.01)
*B62D 7/15* (2006.01)

(52) U.S. Cl.
CPC ........... *B62D 5/0463* (2013.01); *B62D 7/159* (2013.01)

(58) Field of Classification Search
CPC .............................. B62D 5/0463; B62D 7/159
USPC ............................................................ 701/42
See application file for complete search history.

(56) References Cited

U.S. PATENT DOCUMENTS 6,046,560 A 4/2000 Lu et al.
2024/0092418 A1* 3/2024 Kataoka ............... B62D 5/0463

FOREIGN PATENT DOCUMENTS

DE 69931681 T2 5/2007
DE 102014204097 A1 9/2014
DE 102020135060 A1 7/2021

OTHER PUBLICATIONS

DE Office Action for corresponding DE 10 2024 116 727.0 application issued Feb. 12, 2025, 4 pgs., English translation, 2 pgs.

* cited by examiner

*Primary Examiner* — Lindsay M Low
*Assistant Examiner* — Omar Morales
(74) *Attorney, Agent, or Firm* — Dickinson Wright PLLC

(57) ABSTRACT

A method for steering system stability compensation includes receiving a calculated torque value associated with the steering system, providing the calculated torque value to a filter, receiving an output value from the filter, and determining a difference between the output value of the filter and a measured torque value associated with the steering system. The method also includes determining a torque command value based on the calculated torque value and the difference between the output value of the filter and the measured torque value, and controlling a motor associated with the steering system using the torque command value.

19 Claims, 5 Drawing Sheets

SYSTEMS AND METHODS FOR STABILITY COMPENSATION BASED ON ELECTRONIC POWER STEERING TORQUE FEEDBACK

CROSS-REFERENCES TO RELATED APPLICATIONS

This US Utility patent application claims priority to Chinese Patent Application Serial No. 2024107180812, filed Jun. 4, 2024, which is incorporated herein by reference in its entirety.

TECHNICAL FIELD

This disclosure relates to steering systems, and in particular, to systems and methods for position stability compensation based on electronic power steering torque feedback.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for steering system stability compensation. The method includes receiving a calculated torque value associated with the steering system, providing the calculated torque value to a filter, receiving an output value from the filter, and determining a difference between the output value of the filter and a measured torque value associated with the steering system. The method also includes determining a torque command value based on the calculated torque value and the difference between the output value of the filter and the measured torque value, and controlling a motor associated with the steering system using the torque command value.

Another aspect of the disclosed embodiments includes a system for steering system stability compensation. The system includes a processor, and a memory. The memory includes instructions that, when executed by the processor, cause the processor to: receive a calculated torque value associated with the steering system; provide the calculated torque value to a filter; receive an output value from the filter; determine a difference between the output value of the filter and a measured torque value associated with the steering system; determine a torque command value based on the calculated torque value and the difference between the output value of the filter and the measured torque value; and control a motor associated with the steering system using the torque command value.

Another aspect of the disclosed embodiments includes an apparatus for steering system stability compensation. The apparatus includes a controller configured to: receive a calculated torque value associated with the steering system; provide the calculated torque value to a low pass filter; receive an output value from the low pass filter; determine a difference between the output value of the low pass filter and a measured torque value associated with the steering system; provide the difference between the output value of the filter and the measured torque value to a proportional-integral-derivative (PID) controller; receive a PID output from the PID controller; adjust the calculated torque value based on the PID output; determine a torque command value based on the adjusted calculated torque value and the difference between the output value of the low pass filter and the measured torque value; and control a motor associated with the steering system using the torque command value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

Figure 3:
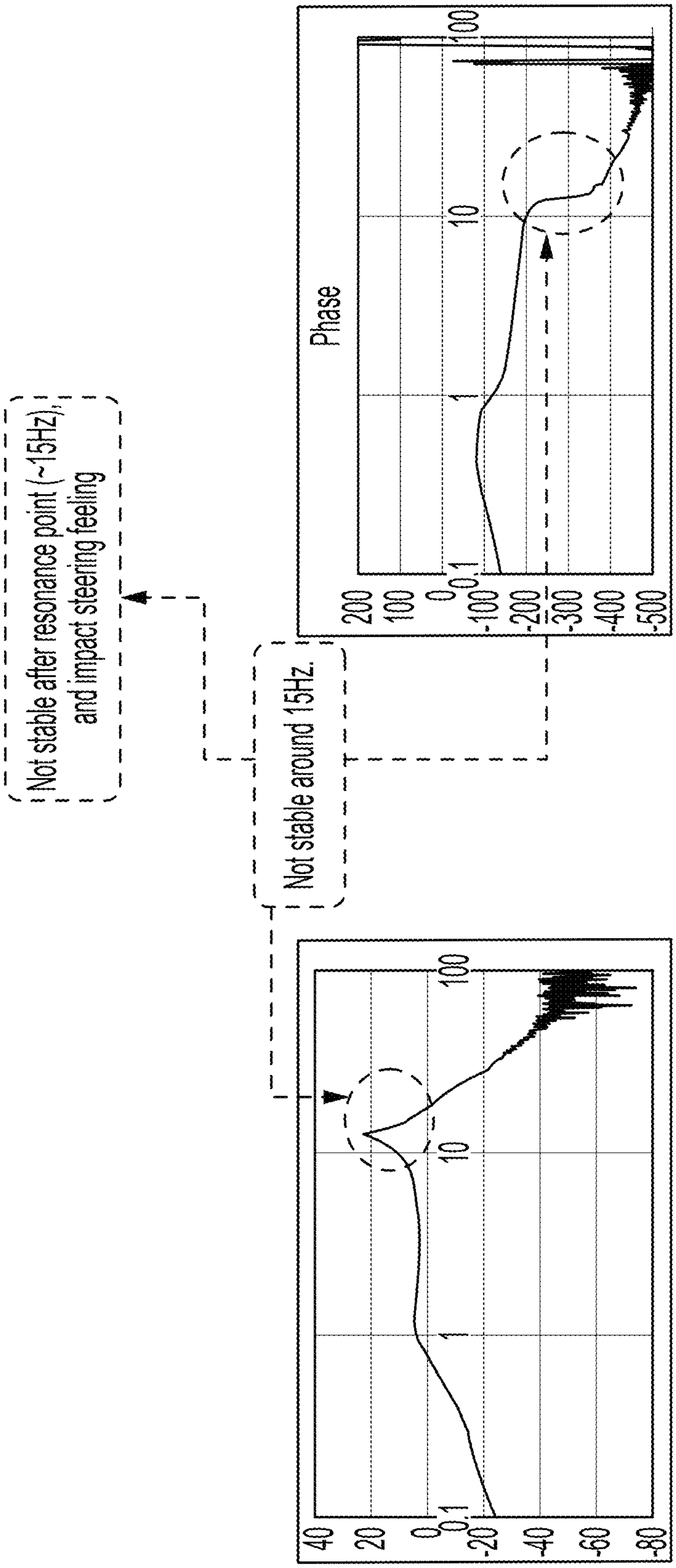
FIG. 3 generally illustrates plot of steering system gain frequencies according to the principles of the present disclosure.

Typically, an EPS steering system gear includes a torsion-bar and handwheel. Such an EPS steering system typically has a system gain that peaks around 15 Hz (e.g., resonance frequency is 15 Hz). Due to increasing gain, the EPS steering system stability is diminished at this frequency, as is generally illustrated in FIG. 3.

Accordingly, systems and methods, such as those described herein, configured to improve EPS steering system stability at various frequencies, may be desirable. Typically, for the EPS control, a system response at 0 Hz~10 Hz is functional at static deviation, a system response at 10 Hz~30 Hz is functional at dynamic tracking, and a system response for high frequency is not necessary, as the main component is noise. Therefore, the systems and methods described herein may be configured to use a low pass filter (LPF) to provide an improved system response.

Figure 4:
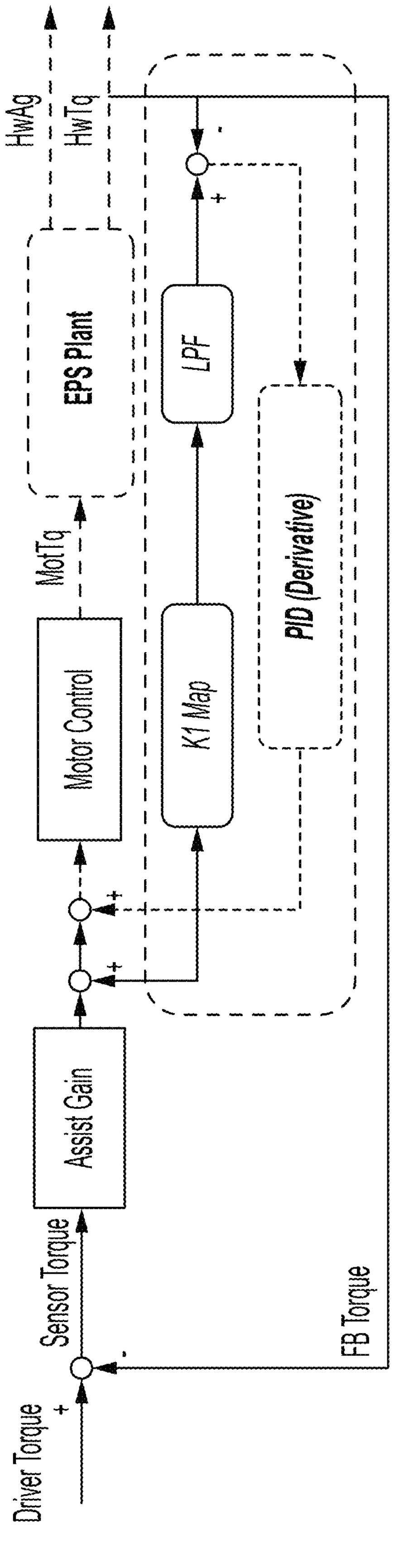
FIG. 4 generally illustrates a stability compensation system according to the principles of the present disclosure.

In some embodiments, as is generally illustrated in FIG. 4, the systems and methods described herein may be configured to use a compensator before the motor control loop to force the EPS plant to have the same response as a low pass filter. The systems and methods described herein may be configured to add a LPF after calculating torque. The systems and methods described herein may be configured to provide as input to the LPF a torque command and receive an output response from the LPF. The systems and methods described herein may be configured to receive an actual handwheel torque from a torque sensor. The systems and methods described herein may be configured to compare the actual torque to the output of LPF to determine the deviation between EPS response and LPF response.

The systems and methods described herein may be configured to, because a requirement for EPS response may vary under different vehicle speeds, add a gain map (e.g., which may be referred to herein as a K1 map) before the LPF to modify the target gain and cut-off frequency (e.g., to increase design freedom).

The systems and methods described herein may be configured to use proportional-integral-derivative (PID) controller (e.g., and/or a linear quadratic regulator (LQR), or any suitable algorithm, such as a state space control algorithm) to feedback and enlarge the deviation between actual handwheel torque and response from LPF. The systems and methods described herein may be configured to add the enlarged deviation to the motor torque command as a compensator. The systems and methods described herein may be configured to use the PID controller in parallel to compensate the main assist path. The systems and methods described herein may be configured to use K1 Map and the LPF to modify the gain and/or phase of the output from the PID controller (e.g., which may be considered as a derivative process for all control systems to add system stability).

In some embodiments, the systems and methods described herein may be configures to receive a calculated torque value associated with the steering system. The systems and methods described herein may be configured to provide the calculated torque value to a filter, such as an LPF or other suitable filter. The systems and methods described herein may be configured to receive an output value from the filter. Additionally, or alternatively, the systems and methods described herein may be configured to determine the output value using the calculated torque value and a look-up table.

The systems and methods described herein may be configured to determine a difference between the output value of the filter and a measured torque value associated with the steering system. The measured torque value may correspond to a handwheel torque value measured by a handwheel torque sensor.

The systems and methods described herein may be configured to determine a torque command value based on the calculated torque value and the difference between the output value of the filter and the measured torque value by adjusting the calculated torque value based on the difference between the output value of the filter and the measured torque value.

The systems and methods described herein may be configured to provide the difference between the output value of the filter and the measured torque value to a PID controller. The systems and methods described herein may be configured to receive a PID output from the PID controller. The systems and methods described herein may be configured to determine the torque command value based on the calculated torque value and the difference between the output value of the filter and the measured torque value by adjusting the calculated torque value based on the PID output.

In some embodiments, the systems and methods described herein may be configured to use a gain map to adjust at least one characteristic of the filter. For example, the systems and methods described herein may be configured to adjust the at least one characteristic of the filter by identifying an adjustment value in the gain map corresponding to a current vehicle speed. The at least one characteristic of the filter may include at least one of a target gain and a cut-off frequency.

The systems and methods described herein may be configured to control a motor associated with the steering system using the torque command value.

Figure 1:
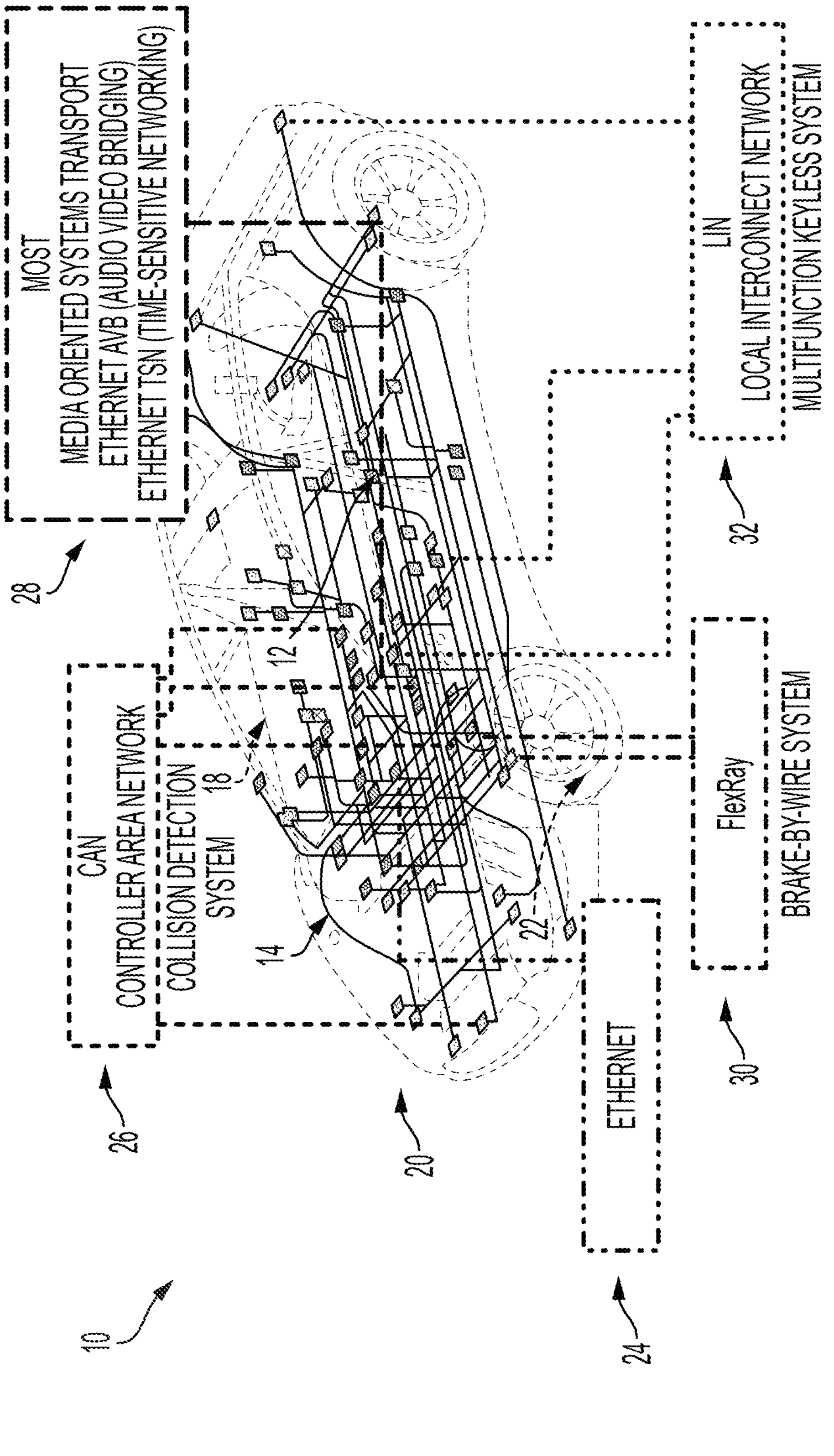
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
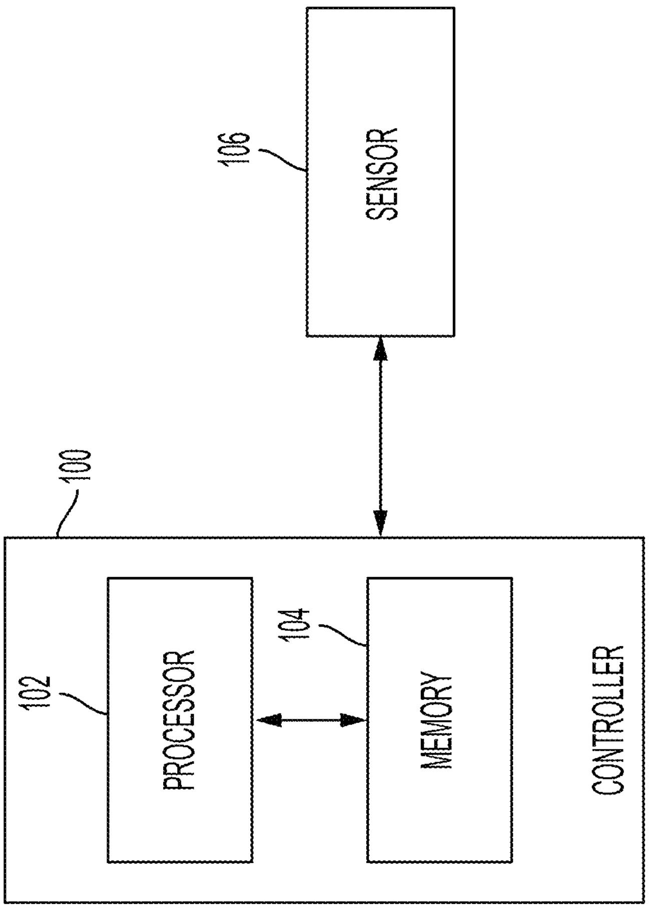
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to provide steering system stability compensation. For example, the controller 100 may receive a calculated torque value associated with the steering system. The controller 100 may provide the calculated torque value to a filter, such as an LPF or other suitable filter. The controller 100 may receive an output value from the filter. Additionally, or alternatively, the controller 100 may determine the output value using the calculated torque value and a look-up table.

The controller 100 may determine a difference between the output value of the filter and a measured torque value associated with the steering system. The measured torque value may correspond to a handwheel torque value measured by a handwheel torque sensor.

The controller 100 may determine a torque command value based on the calculated torque value and the difference between the output value of the filter and the measured torque value by adjusting the calculated torque value based on the difference between the output value of the filter and the measured torque value.

The controller 100 may provide the difference between the output value of the filter and the measured torque value to a PID controller. The controller 100 may receive a PID output from the PID controller. The s controller 100 may determine the torque command value based on the calculated torque value and the difference between the output value of the filter and the measured torque value by adjusting the calculated torque value based on the PID output.

In some embodiments, the controller 100 may use a gain map to adjust at least one characteristic of the filter. For example, the controller 100 may adjust the at least one characteristic of the filter by identifying an adjustment value in the gain map corresponding to a current vehicle speed. The at least one characteristic of the filter may include at least one of a target gain and a cut-off frequency.

The controller 100 may control a motor associated with the steering system using the torque command value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
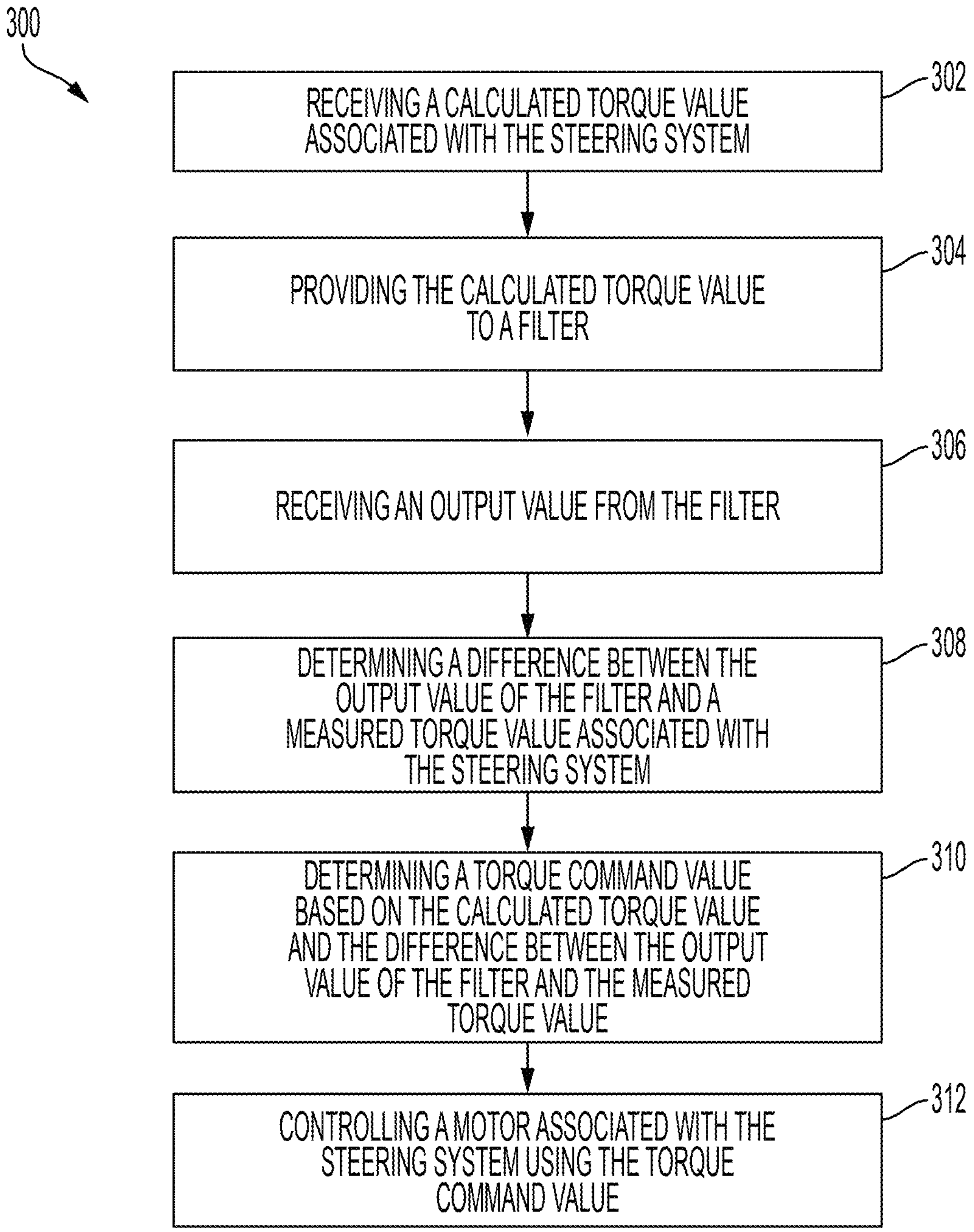
FIG. 5 is a flow diagram generally illustrating a stability compensation method according to the principles of the present disclosure.

FIG. 5 is a flow diagram generally illustrating a stability compensation method 300 according to the principles of the present disclosure. At 302, the method 300 receives a calculated torque value associated with the steering system.

At 304, the method 300 provides the calculated torque value to a filter.

At 306, the method 300 receives an output value from the filter.

At 308, the method 300 determines a difference between the output value of the filter and a measured torque value associated with the steering system.

At 310, the method 300 determines a torque command value based on the calculated torque value and the difference between the output value of the filter and the measured torque value.

At 312, the method 300 controls a motor associated with the steering system using the torque command value.

In some embodiments, a method for steering system stability compensation includes receiving a calculated torque value associated with the steering system, providing the calculated torque value to a filter, receiving an output value from the filter, and determining a difference between the output value of the filter and a measured torque value associated with the steering system. The method also includes determining a torque command value based on the calculated torque value and the difference between the output value of the filter and the measured torque value, and controlling a motor associated with the steering system using the torque command value.

In some embodiments, the steering system include an electronic power steering system. In some embodiments, the filter includes a low pass filter. In some embodiments, the measured torque value corresponds to a handwheel torque value measured by a handwheel torque sensor. In some embodiments, determining the torque command value based on the calculated torque value and the difference between the output value of the filter and the measured torque value includes adjusting the calculated torque value based on the difference between the output value of the filter and the measured torque value. In some embodiments, the method includes providing the difference between the output value of the filter and the measured torque value to a proportional-integral-derivative (PID) controller. In some embodiments, the method includes receiving a PID output from the PID controller. In some embodiments, determining the torque command value based on the calculated torque value and the difference between the output value of the filter and the measured torque value includes adjusting the calculated torque value based on the PID output. In some embodiments, providing the calculated torque value to the filter includes using a gain map to adjust at least one characteristic of the filter. In some embodiments, adjusting the at least one characteristic of the filter includes identifying an adjustment value in the gain map corresponding to a current vehicle speed. In some embodiments, the at least one characteristic of the filter includes at least one of a target gain and a cut-off frequency.

In some embodiments, a system for steering system stability compensation includes a processor, and a memory. The memory includes instructions that, when executed by the processor, cause the processor to: receive a calculated torque value associated with the steering system; provide the calculated torque value to a filter; receive an output value from the filter; determine a difference between the output value of the filter and a measured torque value associated with the steering system; determine a torque command value based on the calculated torque value and the difference between the output value of the filter and the measured torque value; and control a motor associated with the steering system using the torque command value.

In some embodiments, the measured torque value corresponds to a handwheel torque value measured by a handwheel torque sensor. In some embodiments, the instructions further cause the processor to determine the torque command value based on the calculated torque value and the difference between the output value of the filter and the measured torque value by adjusting the calculated torque value based on the difference between the output value of the filter and the measured torque value. In some embodiments, the instructions further cause the processor to provide the difference between the output value of the filter and the measured torque value to a proportional-integral-derivative (PID) controller. In some embodiments, the instructions further cause the processor to receive a PID output from the PID controller. In some embodiments, the instructions further cause the processor to determine the torque command value based on the calculated torque value and the difference between the output value of the filter and the measured torque value by adjusting the calculated torque value based on the PID output. In some embodiments, the instructions further cause the processor to provide the calculated torque value to the filter by using a gain map to adjust at least one characteristic of the filter. In some embodiments, the instructions further cause the processor to adjust the at least one characteristic of the filter by identifying an adjustment value in the gain map corresponding to a current vehicle speed.

In some embodiments, an apparatus for steering system stability compensation includes a controller configured to: receive a calculated torque value associated with the steering system; provide the calculated torque value to a low pass filter; receive an output value from the low pass filter; determine a difference between the output value of the low pass filter and a measured torque value associated with the steering system; provide the difference between the output value of the filter and the measured torque value to a proportional-integral-derivative (PID) controller; receive a PID output from the PID controller; adjust the calculated torque value based on the PID output; determine a torque command value based on the adjusted calculated torque value and the difference between the output value of the low pass filter and the measured torque value; and control a motor associated with the steering system using the torque command value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for steering system stability compensation, the method comprising:
- receiving a calculated torque value associated with the steering system;
- using a K1 map to determine a target gain and cut-off frequency;
- providing the calculated torque value to a filter, wherein the filter is adjusted based on at least one of target gain and the cut-off frequency;
- receiving an output value from the filter;
- determining a difference between the output value of the filter and a measured torque value associated with the steering system;
- determining a torque command value based on the calculated torque value and the difference between the output value of the filter and the measured torque value; and
- controlling a motor associated with the steering system using the torque command value.

2. The method of claim 1, wherein the steering system include an electronic power steering system.

3. The method of claim 1, wherein the filter includes a low pass filter.

4. The method of claim 1, wherein the measured torque value corresponds to a handwheel torque value measured by a handwheel torque sensor.

5. The method of claim 1, wherein determining the torque command value based on the calculated torque value and the difference between the output value of the filter and the measured torque value includes adjusting the calculated torque value based on the difference between the output value of the filter and the measured torque value.

6. The method of claim 1, further comprising providing the difference between the output value of the filter and the measured torque value to a proportional-integral-derivative (PID) controller.

7. The method of claim 6, further comprising receiving a PID output from the PID controller.

8. The method of claim 7, wherein determining the torque command value based on the calculated torque value and the difference between the output value of the filter and the measured torque value includes adjusting the calculated torque value based on the PID output.

9. The method of claim 1, wherein the filter is further adjusted based on the other of the target gain and the cut-off frequency.

10. The method of claim 9, wherein using the K1 map to determine the target gain and cut-off frequency is based on a current vehicle speed.

11. A system for steering system stability compensation, the system comprising:
- a processor; and
- a memory including instructions that, when executed by the processor, cause the processor to:
  - receive a calculated torque value associated with the steering system;
  - use a K1 map to determine a target gain and cut-off frequency;
  - provide the calculated torque value to a filter, wherein the filter is adjusted based on at least one of the target gain and the cut-off frequency;
  - receive an output value from the filter;
  - determine a difference between the output value of the filter and a measured torque value associated with the steering system;
  - determine a torque command value based on the calculated torque value and the difference between the output value of the filter and the measured torque value; and
  - control a motor associated with the steering system using the torque command value.

12. The system of claim 11, wherein the measured torque value corresponds to a handwheel torque value measured by a handwheel torque sensor.

13. The system of claim 11, wherein the instructions further cause the processor to determine the torque command value based on the calculated torque value and the difference between the output value of the filter and the measured torque value by adjusting the calculated torque value based on the difference between the output value of the filter and the measured torque value.

14. The system of claim 11, wherein the instructions further cause the processor to provide the difference between the output value of the filter and the measured torque value to a proportional-integral-derivative (PID) controller.

15. The system of claim 14, wherein the instructions further cause the processor to receive a PID output from the PID controller.

16. The system of claim 15, wherein the instructions further cause the processor to determine the torque command value based on the calculated torque value and the difference between the output value of the filter and the measured torque value by adjusting the calculated torque value based on the PID output.

17. The system of claim 11, wherein the instructions further cause the processor to further adjust the filter based on the other of the target gain and the cut-off frequency.

18. The system of claim 17, wherein the instructions further cause the processor to use the K1 map to determine the target gain and cut-off frequency based on a current vehicle speed.

19. An apparatus for steering system stability compensation, the apparatus comprising:
- a controller configured to:
  - receive a calculated torque value associated with the steering system;
  - use a K1 map to determine a target gain and cut-off frequency;
  - provide the calculated torque value to a low pass filter, wherein the low pass filter is adjusted based on at least one of the gain and cut-off frequency;
  - receive an output value from the low pass filter;
  - determine a difference between the output value of the low pass filter and a measured torque value associated with the steering system;
  - provide the difference between the output value of the filter and the measured torque value to a proportional-integral-derivative (PID) controller;
  - receive a PID output from the PID controller;
  - adjust the calculated torque value based on the PID output;
  - determine a torque command value based on the adjusted calculated torque value and the difference between the output value of the low pass filter and the measured torque value; and
  - control a motor associated with the steering system using the torque command value.

* * * * *